United States Patent [19]

Gijbels et al.

[11] 4,283,633
[45] Aug. 11, 1981

[54] ELECTRO-PNEUMATIC DYNAMO

[76] Inventors: Peter Gijbels, Bosstraat 7, 1920 Diegem; Jozef Gijbels, Tramlaan 148, 1960 Sterrebeek, both of Belgium

[21] Appl. No.: 184,879

[22] Filed: Sep. 8, 1980

[51] Int. Cl.³ .................. H02P 9/04; F02B 53/00
[52] U.S. Cl. ............................ 290/1 R; 290/52; 123/246; 310/168
[58] Field of Search .............. 418/206, 135; 123/217, 123/246; 290/52, 1

[56] References Cited

U.S. PATENT DOCUMENTS

| | | | |
|---|---|---|---|
| 3,157,793 | 11/1964 | Adkins | 290/52 |
| 3,187,191 | 6/1965 | Baggs | 290/52 |
| 3,323,499 | 6/1967 | Gijbels | 418/135 |
| 3,470,408 | 9/1969 | Lewis et al. | 310/168 |
| 3,927,329 | 12/1975 | Fawcett et al. | 290/1 |
| 4,003,349 | 1/1977 | von Habsburg-Lothringen | 123/8.47 |

Primary Examiner—J. V. Truhe
Assistant Examiner—Donald L. Rebsch
Attorney, Agent, or Firm—Allison C. Collard; Thomas M. Galgano

[57] ABSTRACT

An electro-pneumatic dynamo includes a rotary engine having an engine casing, two rotors rotatably mounted within the casing having intermeshing blades and fluid medium inlet means for injecting a fluid medium between two intermeshing teeth of said rotors. The engine casing and blades are made of a non-magnetic material. The dynamo also includes a generator device composed of a plurality of magnetic rods, each of which is mounted in one of the teeth of the blades and a plurality of magnetic circuit elements mounted on the casing for cooperation with the rods. The circuit elements include a coil and a generally U-shaped magnetic bar having a base on which the coil is mounted and two ends between which the rods of one of the rotors passes upon rotation of the rotors so as to induce a flow of magnetic flux through the bar and thereby inducing an emf or current flow in the coil.

6 Claims, 5 Drawing Figures

ELECTRO-PNEUMATIC DYNAMO

The present invention relates to an electropneumatic dynamo or generator. More particularly, it relates to such a dynamo which may be incorporated in an automobile to work as an expansion-engine, delivering electrical power.

In light of the current fuel crisis, the mechanical transmission loss of a car is a very important factor to consider. The transmission of the delivered power, from the output axle shaft of the motor to the adhesion plane of the road, involves significant mechanical losses by friction in all of the interconnected transmission elements. It is generally known that an electric transmission has the greatest efficiency and is, moreover, very adaptable and relatively noiseless.

It is therefore an object of the present invention to provide an electro-pneumatic dynamo which tends to eliminate or at least minimize, as much transmission loss as possible.

It is a further object of the present invention to provide such a dynamo which is relatively simple in construction, economical to fabricate and durable and dependable in operation.

It is a more particular object of the present invention to provide such a dynamo which may be used in an automobile to run electric motors coupled to each of the wheels so as to afford four-wheel drive at high speed with the concomittant benefit of achieving significant fuel savings.

Certain of the foregoing and related objects are readily attained in an electro-pneumatic dynamo which includes a rotary engine having an engine casing, two rotors rotatably mounted within the casing having intermeshing blades and fluid medium inlet means for injecting a fluid medium between two intermeshing blades of the rotors, with the engine casing and blades being made of a non-magnetic material. The dynamo further includes generator means comprising a plurality of magnetic rods, each of which is mounted in the top of each of the blades and a plurality of magnetic circuit means mounted on the casing for cooperation with the rods. The circuit means each comprise a coil, a generally U-shaped magnetic bar having a base on which the coil is mounted and two ends between which the rods of one of the rotors passes upon rotation of the rotors so as to induce a flow of magnetic flux through the bar and thereby induce a current flow in the coil.

Other objects and features of the present invention will become apparent from the following detailed description when taken in connection with the accompanying drawings which disclose one embodiment of the invention. It is to be understood that the drawings are designed for the purpose of illustration only, and are not intended as a definition of the limits of the invention.

In the drawings, wherein similar reference characters denote similar elements throughout the several views.

Figure 1:
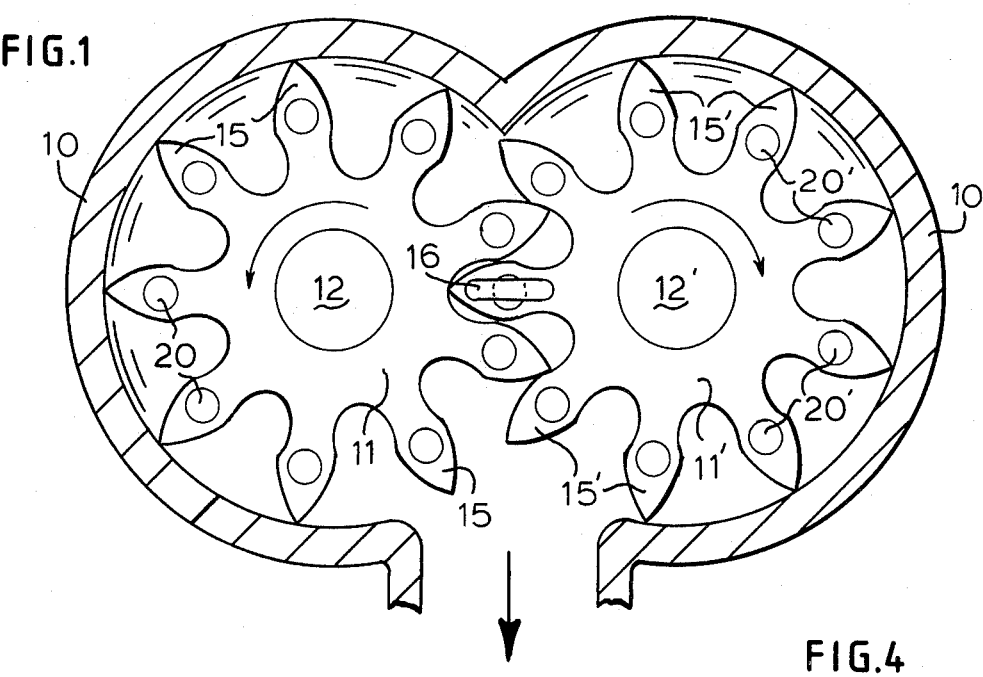
FIG. 1 is a fragmentarily-illustrated sectional view of an engine according to the present invention.

Turning now in detail to the drawings, FIG. 1 is a sectional view of a rotary combustion engine of the type disclosed in U.S. Pat. No. 3,323,499, the subject matter of which is incorporated herein by reference thereto. The engine mainly consists of an engine casing 10 in which two rotors 11, 11' are rotatably supported by means of shafts 12 and 12', respectively, and by bearings (not shown). The rotors 11, 11' rotate in opposite directions and are each provided with a set of rotor blades 15, 15', in this case nine, each set of which is configured to permit meshing engagement thereof with the blades 15 of the other set. Although not illustrated, shafts 12, 12' at the ends thereof, outside of casing 10, are provided with intermeshing cog-wheels or gears to effect proper meshing of the sets of blades 15, 15'.

Figure 3:
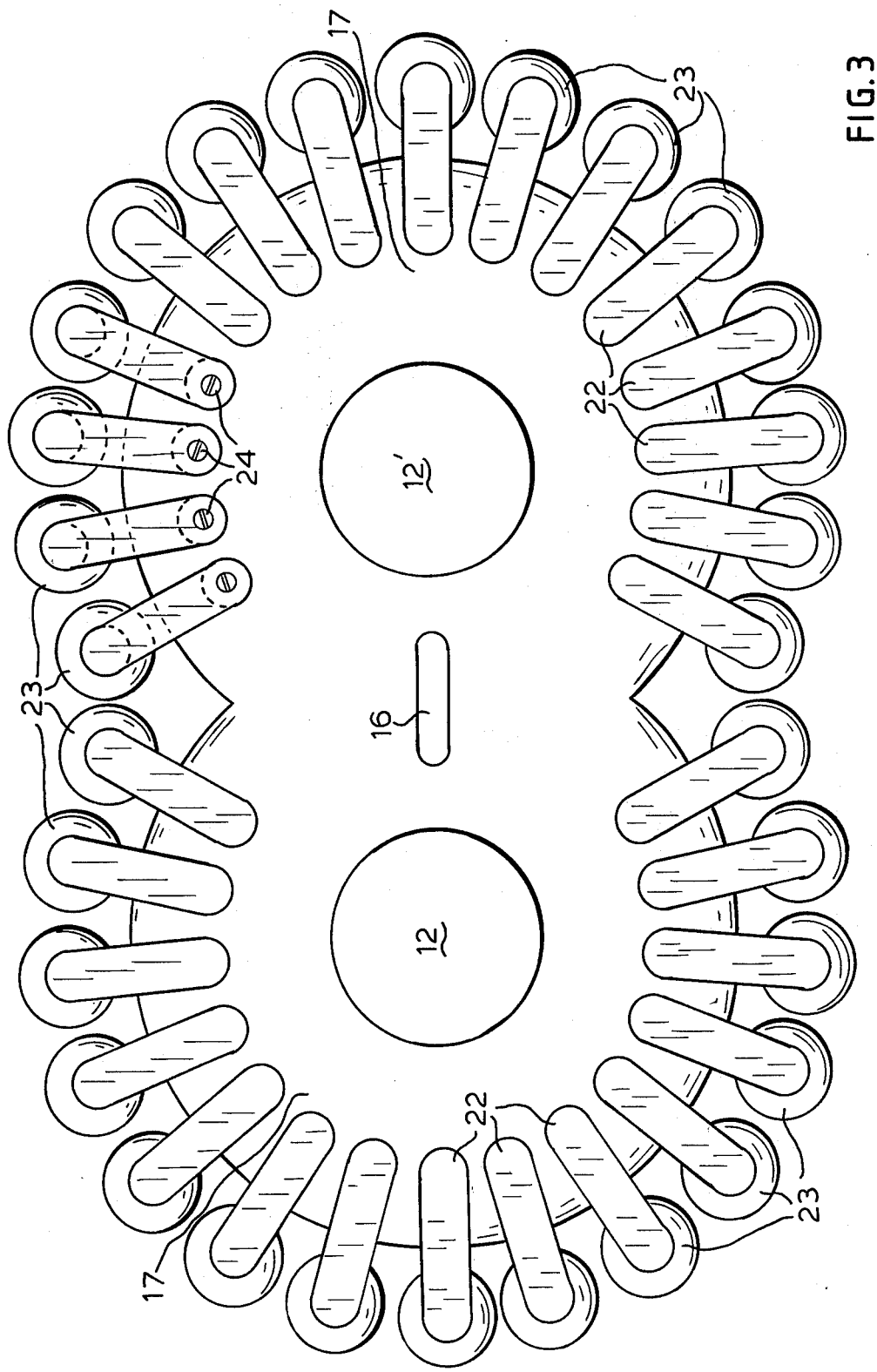
FIG. 3 is an enlarged, end view of the engine shown in FIG. 1, further showing the cover plate in position, with a multiplicity of the dynamo circuit elements mounted thereon.

In operation, gases under pressure are injected through inlet opening 16 provided on both cover plates 17 of casing 10 (see FIG. 3). This double opening ensures a good penetration of the pressurized gases, thereby resulting in complete filling of the passing chambers. The pressurized gases are fed into the chamber defined between the intermeshing set of blades 15, 15'. The mechanical expansion ratio is about 4:1 for rotors having nine teeth. This causes rotation of rotors 11 and 11' as more fully explained in the aforesaid patent, as the engine is working as an explosion-motor.

In accordance with the present invention, casing 10, rotors 11 and 11' and cover plates 17 are made of a strongly non-magnetic material and steel magnets or iron cylindrical rods 20 are inserted in longitudinal bore holes of each of the blades 15, 15' at the point of their greatest breadth. Alternatively, rods 20 could be electro-magnets fed externally with direct current. For instance, rods 20 could comprise electrical conductors all of which would be coupled to two contact rings fixed upon the shafts, with direct current being fed thereto by the contact brushes. In this case, the desired voltage of the electro-pneumatic dynamo can be regulated by varying the value of the direct current supplied and thereby the excitation of the electro-magnets.

Figure 2:
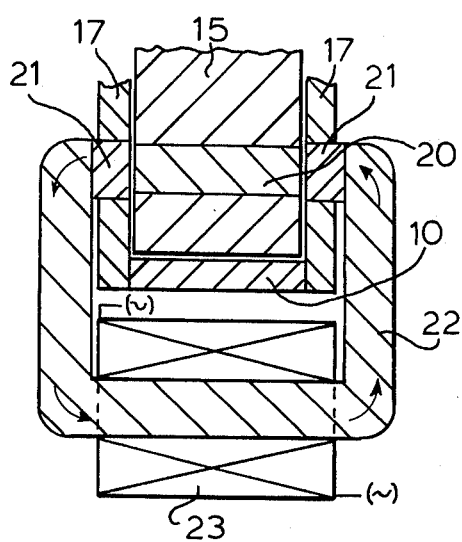
FIG. 2 is an enlarged, fragmentarily-illustrated vertical sectional view through one of the rotor blades and the associated engine casing shown in FIG. 1.

As shown in FIG. 2, rods 20 are disposed for successive intermittent registry with paired iron plugs or inserts 21 which are mounted in cover plates 17, lying flush with the interior surface thereof but projecting slightly beyond the outer surface thereof by a few millimeters. Plugs 21 are, in turn, coupled to the opposite ends of a generally U-shaped iron bar 22 so as to define a generally square-shaped toroidal magnet. A coil 23 is placed around the base of the bar 22 and the direction of the magnetic flux is shown by the arrows.

Upon rotation of rotors 11, 11', magnetic rods 20 will pass between plugs 21 thereby producing a magnetic current rising from zero to a maximum value and then back to zero again, thereby inducing a period of alternating current in coil 23.

Figure 4:
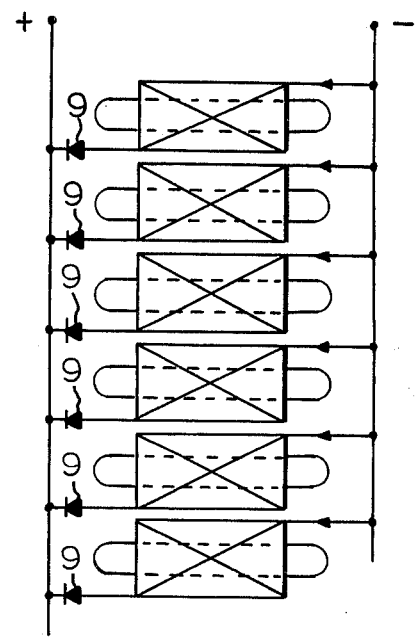
FIG. 4 is a rectifier circuit diagram.

If all the magnets 20 in blades 15 are placed with their similar poles on the same side, and if a large number of the aforementioned circuit element sets are mounted upon the engine, as shown in FIG. 3, one can connect all the coils 23 on one side, on a plus-collector-conductor, and on the other side, on a minus-collector-conductor (FIG. 4). In every coil 23, there is induced an alternating current, but because of the placed diodes 9, only the positive alternating current pulses can reach the positive collector-conductor; the other half or negative pulses of the alternating voltage are not used.

Figure 5:
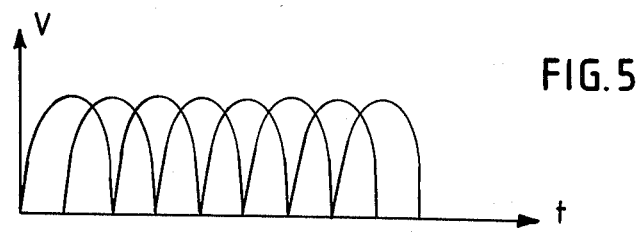
FIG. 5 is a diagram of the voltage vs. time curve of the emf induced by the multiplicity of rectified dynamo circuits.

If the engine is operated, then it shall deliver a direct current, composed of a very great number of current pulses which are equal in amplitude, but differ in time. The electrical current pulses from the left side of the dynamo (see FIG. 1) are situated between the current pulses of the right side. Because of the position of the blades 15' upon the right rotor 11', with respect to the blades 15 of the left rotor 11, the magnetic fluxes produced an emf following the FIG. 5 curve.

Because of the fact that more coils are placed on both sides of the dynamo as there are blades 15, 15' upon the rotors 11, 11', all current pulses differ in time. The produced direct current must be flattened by a choke or smother-coil.

It should, of course, be realized that by varying the number of plugs 21 and their location, the interconnections of the coils, the direction of the magnets 20 in the blades 15, 15', etc. many different circuit combinations are possible, and the electro-pneumatic dynamo can also deliver single-phase alternating current, two-phase alternating current 180 degrees displaced with respect to each other, etc.

By equipping the electro-pneumatic dynamo with e.g., 30 coils 23, by letting the engine turn at 3,000 rev/min, and by interconnecting coils 23 as shown in FIG. 4, one obtains: $50 \times 2 \times 15 \times 9 = 13,500$ current pulses per second, which together compose the delivered direct current.

This very great number of current pulses in such a small unit of time, indicates that only small electro-magnets 20 in the blades 15 need be used; otherwise, the pneumatic engine would not be strong enough. One need not take off more electric energy, as the pneumatic motor can deliver mechanical energy.

The delivered voltages can be chosen as desired by the interconnecting of the coils 23 in series or parallel, and by changing the excitation of the electro-magnets 20 in the blades. The arrangement of diodes 9 can also be altered, as required.

The electro-pneumatic dynamo can also be driven by compressing air, with steam, with water under pressure, with a small waterfall, with the hot water with a certain interior pressure from a boiler, etc. However, as a first immediate application of this new invention, one can drive the electro-pneumatic dynamo with the output gases of an explosion- or combustion-motor, while the same provides mechanical power to drive a car, for example.

The output-gases are then much farther exhausted, and the transmission losses strongly reduced, what surely shall lead to important savings of fuel.

Another important result is that the car can be braked by electrical means with the present electric motors upon the wheels. If one drives these four series-motors with the kinetic energy of the car, they become dynamos too, and if we spend the developed electrical energy in a resistance, the whole is a very efficient braking system for the car.

These electrical brakes can be used as a back up to the conventional drum or disc brakes. They would afford greater driving safety, especially on hills and mountains, where grave accidents can frequently occur due to faulty brakes.

Alternatively, the electro-pneumatic dynamo could be driven by a waterfall. However, because water cannot be expanded, a big inlet must be made in the top of the casing; the output remaining below the engine works then as a simple cog-wheel-pump, producing electric power.

Thus, while only one embodiment of the present invention has been shown and described, it should, of course, be realized, that many changes and modifications may be made thereunto, without departing from the spirit and scope of the invention.

What is claimed is:

1. An electro-pneumatic dynamo comprising:
   a casing, two rotors rotatably mounted within said casing having intermeshing blades and inlet means for introducing a fluid between two intermeshing blades of said rotors, said casing and blades being made of a non-magnetic material; and
   generator means including a plurality of magnetic rods, each of which is mounted in the top of each of said blades and a plurality of magnetic circuit means mounted on said casing for cooperation with said rods, said circuit means each comprising a coil, a generally U-shaped magnetic bar having a base on which said coil is mounted and two ends between which said rods of one of said rotors passes upon rotation of said rotors so as to induce a flow of magnetic flux through said bar and thereby inducing a current flow in said coil.

2. The dynamo according to claim 1, wherein said generator means additionally includes means for rectifying the alternating current induced in said coil.

3. The dynamo according to claim 1, wherein said means for rectifying comprises diode circuits or thyristor circuits.

4. The dynamo according to claim 1, wherein said rods and bars are made from iron.

5. The dynamo according to claim 1, wherein said circuit means includes iron plugs mounted in said cover plates to which the ends of said bars are secured.

6. The dynamo according to claim 1, wherein said inlet means comprise fluid medium inlet means for injecting a fluid medium.

* * * * *